(12) United States Patent
Yamaji

(10) Patent No.: US 9,776,802 B2
(45) Date of Patent: Oct. 3, 2017

(54) DRIVE DEVICE FOR BELT CONVEYOR DEVICE

(71) Applicant: SANKI ENGINEERING CO., LTD., Tokyo (JP)

(72) Inventor: Yoshiteru Yamaji, Machida (JP)

(73) Assignee: SANKI ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 15/117,394

(22) PCT Filed: Jul. 14, 2014

(86) PCT No.: PCT/JP2014/003722
§ 371 (c)(1),
(2) Date: Aug. 8, 2016

(87) PCT Pub. No.: WO2015/121901
PCT Pub. Date: Aug. 20, 2015

(65) Prior Publication Data
US 2016/0347548 A1 Dec. 1, 2016

(30) Foreign Application Priority Data

Feb. 13, 2014 (JP) .................................. 2014-025442

(51) Int. Cl.
*B65G 15/00* (2006.01)
*B65G 23/12* (2006.01)
(Continued)

(52) U.S. Cl.
CPC .............. *B65G 23/12* (2013.01); *B65G 15/00* (2013.01); *B65G 23/10* (2013.01); *B65G 23/44* (2013.01)

(58) Field of Classification Search
CPC ........ B65G 15/00; B65G 23/10; B65G 23/12; B65G 23/44
See application file for complete search history.

(56) References Cited

U.S. PATENT DOCUMENTS

| 1,776,419 | A | * | 9/1930 | Dodge | .................. B65G 23/00 |
| | | | | | 198/497 |
| 2,875,888 | A | * | 3/1959 | Swain | .................. B65G 23/34 |
| | | | | | 198/318 |

(Continued)

FOREIGN PATENT DOCUMENTS

| EP | 1418139 A1 * | 5/2004 | ............. B65G 23/12 |
| FR | 2 771 080 A1 | 5/1999 | |

(Continued)

OTHER PUBLICATIONS

Oct. 14, 2014 Search Report issued in International Patent Application No. PCT/JP2014/003722.

(Continued)

*Primary Examiner* — Mark A Deuble
(74) *Attorney, Agent, or Firm* — Oliff PLC

(57) ABSTRACT

A drive device for a belt conveyor device includes a drive pulley, a first pulley, a second pulley, a support frame, and a drive motor. The drive pulley has a drive shaft direction length less than a plurality of previously set belt widths of the endless belt and has the driving shaft direction length being set to a same length regardless of the plurality of previously set belt widths of the endless belt. Axial lengths of the first pulley and the second pulley are set to the same length as the axial lengths of the head pulley and the tail pulley. The support frame is rotatably attached to the first pulley and the second pulley. The drive motor hung from a lower surface of the support frame in order for the drive pulley to be positioned at an approximately center portion in a width direction of the endless belt.

9 Claims, 9 Drawing Sheets

(51) Int. Cl.
*B65G 23/44* (2006.01)
*B65G 23/10* (2006.01)

(56) References Cited

U.S. PATENT DOCUMENTS

| | | | |
|---|---|---|---|
| 5,871,085 A | 2/1999 | Yagi | |
| 6,971,509 B2* | 12/2005 | Ertel | B65G 21/06 198/813 |
| 2007/0295583 A1* | 12/2007 | Hall | B65G 21/00 198/860.5 |
| 2013/0264176 A1* | 10/2013 | Knas | B65G 23/10 198/835 |

FOREIGN PATENT DOCUMENTS

| | | | | |
|---|---|---|---|---|
| GB | 2165516 A | * | 4/1986 | ............ B65G 21/00 |
| JP | S56-103508 U | | 8/1981 | |
| JP | S61-295913 A | | 12/1986 | |
| JP | H09-100016 A | | 4/1997 | |
| JP | H09-175618 A | | 7/1997 | |
| JP | 2001-080719 A | | 3/2001 | |
| JP | 2002-137816 A | | 5/2002 | |
| JP | 3290415 B2 | | 6/2002 | |
| JP | 2005-212918 A | | 8/2005 | |
| JP | 3784044 B2 | | 6/2006 | |

OTHER PUBLICATIONS

Aug. 16, 2016 International Preliminary Report on Patentability issued in International Patent Application No. PCT/JP2014/003722.
Aug. 1, 2017 Office Action issued in Japanese Patent Application No. 2014-025442.

* cited by examiner

DRIVE DEVICE FOR BELT CONVEYOR DEVICE

CROSS-REFERENCE TO RELATED APPLICATION

This application is a U.S. National Stage application claiming the benefit of prior filed International Application Number PCT/JP2014/003722, filed Jul. 14, 2014, in which the International Application claims priority from Japanese Patent Application Number 2014-025442, filed on Feb. 13, 2014, the entire contents of which are incorporated herein by reference.

TECHNICAL FIELD

The present invention relates to a drive device for a belt conveyor device which conveys a conveyance object.

BACKGROUND ART

Recently, in our country, it has been shifted from heavy industry to light industry in which specialty products are manufactured and dealt. The number of situations where food products, medical products, cosmetics, automotive parts and the like are dealt is increasing, and needs for conveyance of lightweight objects in which the above products are dealt between processes or in distribution are on the rise.

Needs of various users such as a machine length and a belt width regarding a conveyor for conveyance of lightweight objects in which the lightweight objects as described above are dealt have been conventionally changed depending on a conveyance object or a conveyance line of the conveyor, and in order to serve the needs promptly at a low price, parts are used in common. However, since the parts are used in common, a drive unit having the most complicated mechanism is always provided in accordance with the largest belt width among belt widths which are set in common, which leads to increase in size of the parts, and increase in the number of parts.

In a belt conveyor device which conveys a conveyance object, an endless belt is laid between a tail pulley disposed at an end portion on an upstream side in a conveyance direction and a head pulley disposed at an end portion on a downstream side in the conveyance direction, and there is provided a drive device for making the endless belt travel on a return route side of the endless belt (refer to Patent Document 1). The drive device is generally disposed at a position in the vicinity of the head pulley on the return route side of the endless belt laid between the head pulley and the tail pulley, or the like.

Each of FIG. 8 and FIG. 9 illustrates one example of a drive device used for a belt conveyor device. In the drive device 100, a drive motor 101 and a drive pulley 102 are respectively fixed to a frame 103 so that an axial direction of an output shaft 101a of the drive motor 101 being a driving force source and an axial direction of a rotary shaft 102a of the drive pulley 102 become parallel, and a snub pulley 110 is positioned between the drive motor 101 and the drive pulley 102. By designing as above, an endless belt which is wound around the drive pulley 102 is turned back by the snub pulley 110, so that the drive motor 101 can be positioned outside the endless belt, resulting in that a power transmission part can be freely arranged. Note that in the drive device 100 illustrated in FIG. 8 and FIG. 9, the frame 103 is formed by combining plural members 103a, 103b, 103c, 103d, and 103e, in order to support both ends of the rotary shaft 102a of the drive pulley 102 and to support the drive motor 101 on a machine side. Further, in the drive device 100, the drive pulley 102 is attached to side frames 103a, 103b which form the frame 103, in a state where both end portions of the rotary shaft 102a of the drive pulley 102 are pivotally supported by bearing members 104, 105. Accordingly, the side frames 103a, 103b have to be made of a metal material with large rigidity, in order to receive force applied to the bearing members 104, 105. The drive motor 101 and the drive pulley 102 are disposed so that the axial direction of the output shaft 101a of the drive motor 101 and the axial direction of the rotary shaft 102a of the drive pulley 102 become parallel, sprockets 107, 108 are fixed to the output shaft 101a of the drive motor 101 and the rotary shaft 102a of the drive pulley 102, respectively, and a chain 109 is wound around the sprockets 107, 108, to form the power transmission part, thereby transmitting driving force of the drive motor 101 to the drive pulley 102. A change of direction of the driving force is made at the power transmission part, and also from that point, the side frame 103b is required to be made of the metal material with large rigidity. Further, in the drive device 100, the snub pulley 110 and a take-up pulley 111 which turn back the front side of the endless belt toward the drive pulley 102 on the return route side of the endless belt are provided, and in addition to that, a safety cover 112 for the snub pulley 110, a fixing key plate 113 for the sprocket 108, and the like are also provided. Besides, there are also provided large-sized covers 114, 115, 116, and 117, which cover the outer part of the side frame 103, in order to cover the drive motor 101 and the respective pulleys assembled to the frame 103.

Further, in order to suppress occurrence of scratch on an outer surface (conveyance surface) of the belt and to secure a scratch-free belt surface over a long period of time in a manner that a scratch occurs only in a predetermined width close to one side portion in a width direction of the outer surface of the belt, and no scratch occurs on the other portion, there is also disclosed, as another drive device for a belt conveyor, a drive device for a belt conveyor in which a drive mechanism is positioned close to one side in the width direction of the belt and a short cylindrical drive pulley is disposed inside the belt, and a pinch roller to press the endless belt against the drive pulley, and a guiding unit supporting the belt in a state similar to a winding state of the drive pulley on the opposite side in the belt width of the line on which the drive mechanism is positioned (refer to Patent Document 2).

PRIOR ART DOCUMENTS

Patent Documents

Patent Document 1: Japanese Patent No. 3784044
Patent Document 2: Japanese Patent No. 3290415

DISCLOSURE

Problems to be Solved

In the drive device 100 illustrated in FIG. 8 and FIG. 9, the number of parts which form the device is large, the size and the weight of the parts are also large, and further, the number of fastening members such as bolts and pins used for assembling these parts also becomes large, as in the exploded view of FIG. 9 in which the members, if not all, are illustrated. Therefore, these become causes of increasing product costs of respective parts which form the drive device as above, and manufacturing costs at the time of assembling the drive device. Further, when manufacturing a belt conveyor device having plural endless belt widths in accordance with sizes of conveyance objects to be conveyed with the same configuration, parts which meet the specifications of the endless belt are required as parts which form the drive device. A drive unit to which force is particularly applied has to prepare drive pulleys 102 with various dimensions. Therefore, when manufacturing a belt conveyor device for light conveyance object in which there are plural demands regarding the width of endless belt, it is required to manufacture parts which form a drive device in accordance with a width dimension of the endless belt, so that the number of parts to be prepared as a product series is further increased, which leads to increase in the product costs and the manufacturing costs.

Further, since the power transmission realized by the sprockets 107, 108, and the chain 109 is used for providing the degree of freedom to the power transmission part of the drive motor 101, oil-feeding for lubricating the members becomes necessary. Further, since the side frames 103a, 103b are made of the metal material with large rigidity in order to receive the force applied to the bearing members 104, 105, a side surface of the drive pulley 102 is invisible, and thus a contact surface between a rear surface of the belt and the drive pulley 102 cannot be seen.

The drive device in Patent Document 2 employs the short cylindrical cantilever drive pulley, and the drive mechanism is positioned close to the one side in the width direction of the belt and the drive pulley is disposed inside the belt. Also the drive device includes the pinch roller to press the endless belt against the drive pulley, and the guiding unit supporting the belt in the state similar to the winding state of the drive pulley on the opposite side in the belt width of the line on which the drive mechanism is positioned. As a result, the number of parts increases. Further, since the drive mechanism is positioned close to the one side in the width direction of the belt and the drive pulley is disposed inside the belt, even if the guiding unit is provided, the guiding unit only follows and does not synchronize with the driving pulley, resulting in that meandering of the endless belt is facilitated. Further, a gearbox 9 and a motor 10 are fixed to a side frame, and a bearing of the guiding unit facing the gearbox 9 and the motor 10 is fixed to a side frame, so that both of the side frames are made of a metal material that it is not possible to see a contact surface between a rear surface of the belt and the drive pulley.

The present invention is made for solving the above-described problems, and a proposition of present invention is to provide a drive device for a belt conveyor device capable of suppressing product costs of parts which includes the device and manufacturing costs when manufacturing the device. Further, a proposition of present invention is to provide a drive device for a belt conveyor device whose maintenance is easy and capable of preventing troubles from occurring.

Means for Solving the Problems

In order to solve the above-described problems, a drive device for a belt conveyor device of the present invention which conveys a conveyance object by making travel an endless belt being laid over a head pulley disposed on one end side of a conveyor frame having an axial length smaller than an endless belt width by a predetermined amount and a tail pulley disposed on the other end side of the conveyor frame having an axial length smaller than the endless belt width by a predetermined amount, the drive device for the belt conveyor device includes a drive pulley making the endless belt travel during a rotary-drive by being wound a rear surface of the belt on a return route side of the endless belt, having a drive shaft direction length less than a plurality of previously set belt widths of the endless belt with respect to a plurality of types of the belt conveyor device being set a plurality of machine widths, and having the driving shaft direction length being set to a same length regardless of the plurality of previously set belt widths of the endless belt; a first pulley turning back a front surface of the belt on the return route side of the endless belt turned back by the tail pulley toward the drive pulley, having an axial length being set in accordance with the plurality of previously set belt widths of the endless belt, and having the axial length being set to the same length as that of the head pulley and the tail pulley; a second pulley turning back the front surface of the belt on the return route side of the endless belt turned back by the head pulley toward the drive pulley, having an axial length being set to the same length as that of the first pulley; a support frame being provided to a lower portion of the conveyor frame and being rotatably attached the first pulley and the second pulley at both ends in a pivotally supported manner; a drive motor having the drive shaft of the drive pulley as an output and being hung from a lower surface of the support frame in order for the drive pulley to be positioned at an approximately center portion in a width direction of the endless belt laid on the belt conveyor device; and a take-up mechanism being capable of applying tension to the endless belt by being adjusted a position of either the first pulley or the second pulley toward the second pulley or the first pulley.

Further, it is preferable to be used for a drive unit of a belt conveyor device which has an outer shape of each of the head pulley and the tail pulley fixed in the axial direction.

Further, it is characterized in that the drive motor attaches a motor bracket in a shape of plate to a casing surface which faces the drive pulley fitted to the output shaft in a cantilever manner and from which the output shaft projects, and is hung from the lower surface of the support frame by the motor bracket.

Further, it is characterized in that a disk part being a part of the drive pulley and to which the drive shaft is fitted is offset from a center in the width direction of the endless belt to the drive motor side.

Further, it is characterized in that, on the other end side being an opposite side of one end on the drive motor side in the drive shaft direction of the drive pulley, a plurality of auxiliary rollers abutted against an outer peripheral surface of the drive pulley is hung from the support frame.

Further, it is preferable that the drive pulley is performed lining processing on a portion of the outer peripheral surface excluding a range in which the plurality of auxiliary rollers are abutted.

Further, it is preferable that the plurality of auxiliary rollers is performed lining processing on each of outer peripheral surfaces of the plurality of auxiliary rollers.

Further, it is characterized in that the drive pulley is performed lining processing on the entire outer peripheral surface of the drive pulley.

Further, it is characterized in that there are provided plural plurality of covers being attached to the support frame covering the drive pulley, the first pulley, and the second pulley, in which the plurality of covers, among the plurality of covers, at least a cover covering the end side being an opposite side of an end to which the output shaft of the drive motor is attached among both ends in the drive shaft direction of the drive pulley is formed of a material with transparency.

Effects

According to the present invention, it is possible to suppress product costs of parts which includes the device and manufacturing costs when manufacturing the device.

Further, according to the present invention, since the lengths of the tail pulley, the head pulley, the first pulley, and the second pulley are equal, and each of the lengths is smaller than the width of the endless belt by the predetermined amount, it is possible to prevent meandering of the belt.

Further, according to the present invention, the plate-shaped motor bracket is attached to the casing surface which faces the drive pulley fitted to the output shaft in a cantilever manner and from which the output shaft projects, and the drive motor is hung from the lower surface of the support frame by using the motor bracket, so that the drive motor can receive a torsional moment applied to the drive shaft due to reaction force received by the drive pulley from the endless belt, at the most advantageous position, and can reduce the moment with respect to the drive shaft by effectively utilizing the width of the motor bracket. Further, according to the present invention, since the disk part being a part of the drive pulley and to which the drive shaft is fitted, is offset from the center in the width direction of the endless belt to the drive motor side, it is possible to reduce the moment applied to the drive shaft.

Further, according to the present invention, since the plural auxiliary rollers which are abutted against the outer peripheral surface of the drive pulley are hung from the support frame, on the other end portion side being the opposite side of the one end portion on the drive motor side in the drive shaft direction of the drive pulley, it is possible to reduce the moment with respect to the drive shaft regardless of a limited shaft diameter of the drive shaft being the output shaft of the drive motor.

Further, according to the present invention, by appropriately performing the lining on the drive pulley and the auxiliary rollers related to the driving, vibration caused by contact between the rear surface of the belt and the drive pulley is absorbed by the lining, resulting in that it is possible to prevent excessive force from being applied to the drive shaft.

Further, according to the present invention, the drive pulley is hung from the lower surface of the support frame and a side frame made of a metal material is not required, so that at least the cover covering, out of the both end portions in the drive shaft direction of the drive pulley, the end portion side being the opposite side of the end portion to which the output shaft of the drive motor is attached, can be formed of the material with transparency. Accordingly, the contact surface between the rear surface of the belt and the drive pulley, and the periphery of the contact surface of the rear surface of the belt can be made visible, so that the maintenance is easy, and occurrence of biting into the belt can be prevented.

DETAILED DESCRIPTION OF THE EMBODIMENTS

Figure 1:
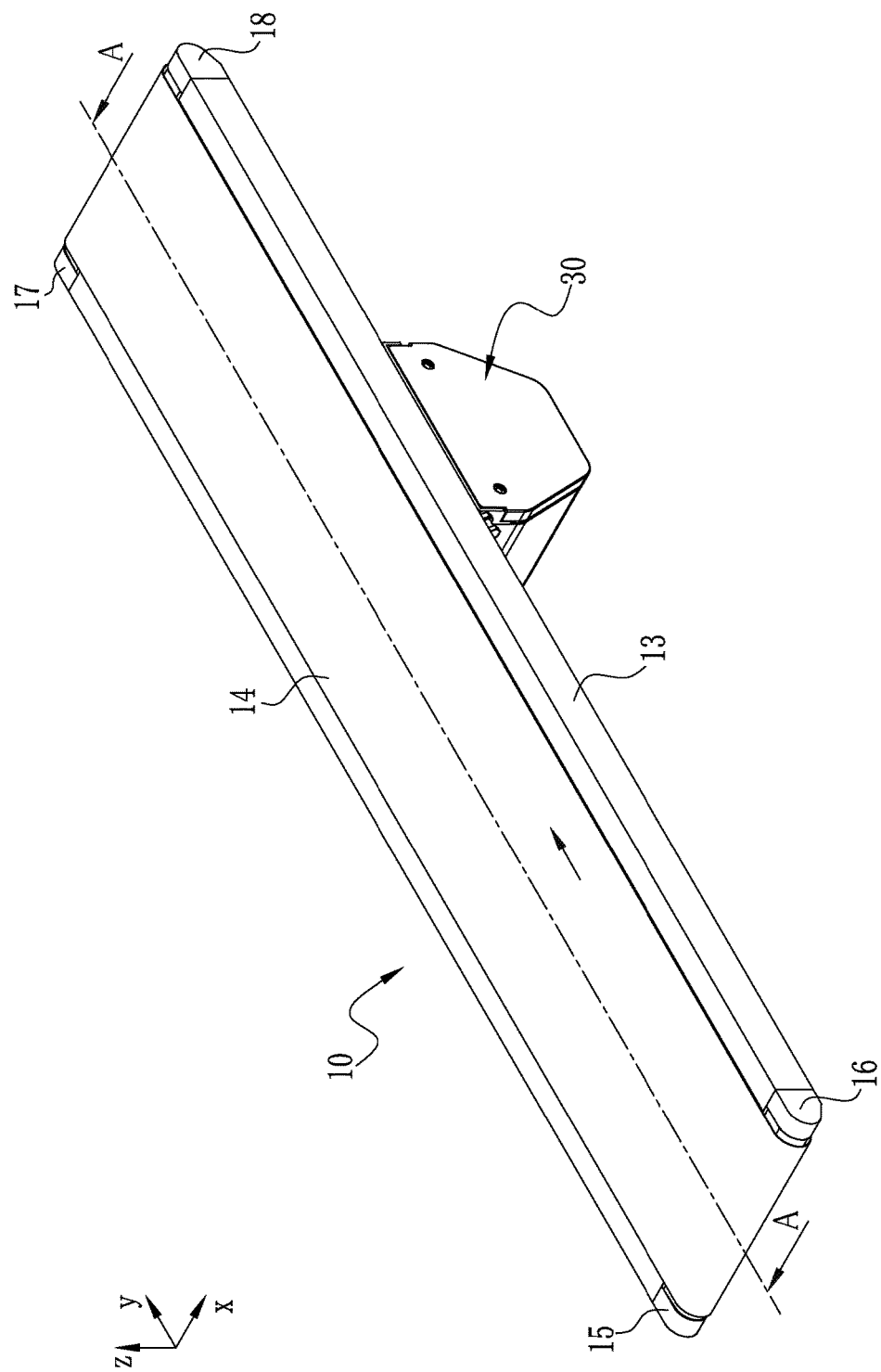
FIG. 1 shows a perspective view illustrating one example of a belt conveyor device provided with a drive device of the present invention.
Figure 2:
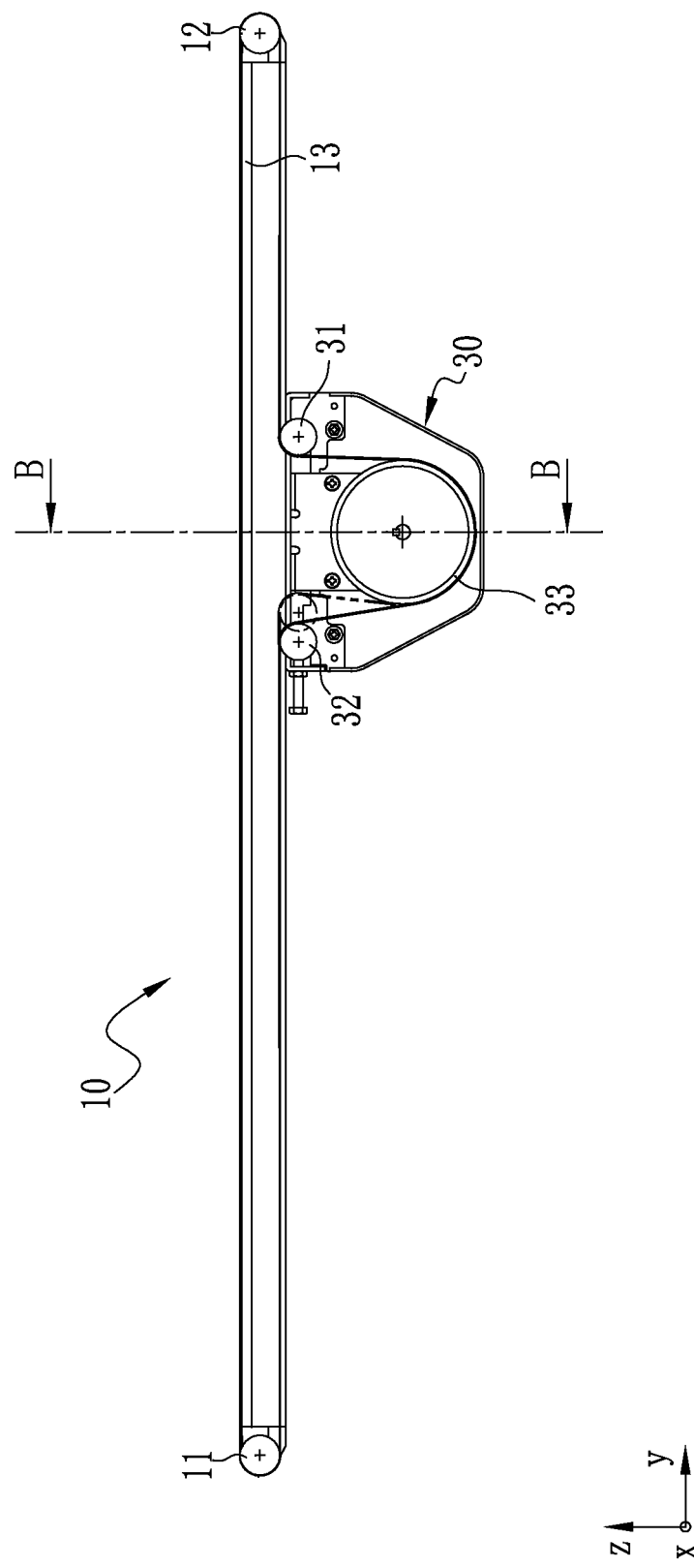
FIG. 2 shows a A-A cross sectional view in FIG. 1.
Figure 3:
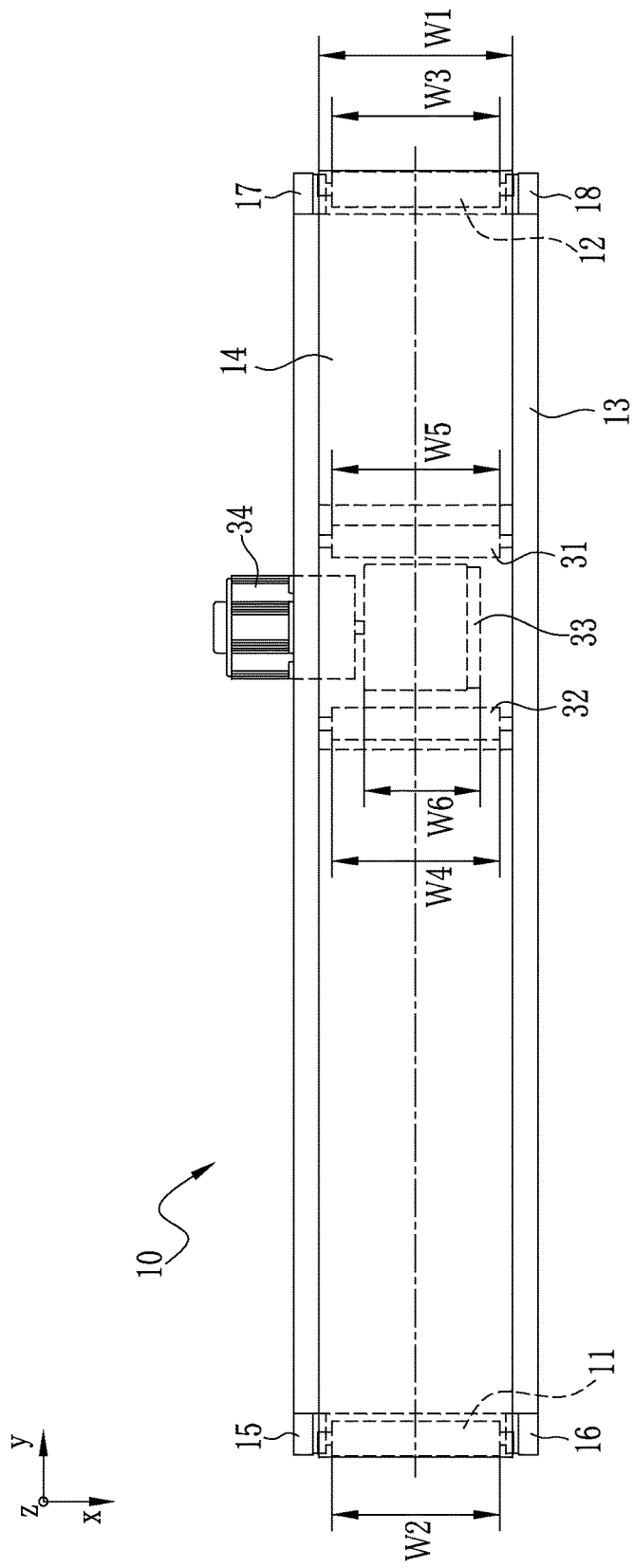
FIG. 3 shows a top view of the belt conveyor device.

Hereinafter, a belt conveyor device provided with a drive device of the present invention will be described. A belt conveyor device 10 illustrated in FIG. 1 to FIG. 3 is a belt conveyor device which conveys a lightweight conveyance object (conveyance object whose weight is up to about 10 kg) such as food products, medical products, cosmetics, and automotive parts. In this belt conveyor device, plural specifications regarding an endless belt to be used are set. Note that as the specification of the endless belt 14, there can be cited a belt width of the endless belt 14.

The belt conveyor device 10 includes two pulleys 11, 12, a conveyor frame 13, the endless belt 14, and a drive device 30. Hereinafter, out of the two pulleys 11, 12, the pulley 11 disposed on an upstream side in a conveyance direction of a conveyance object (y direction in FIG. 1) is referred to as a tail pulley 11, and the pulley 12 disposed on a downstream side in the conveyance direction is referred to as a head pulley 12. The tail pulley 11, the head pulley 12, and the conveyor frame 13 are formed of a metal material such as aluminum, for example. Note that in FIG. 1 to FIG. 3, illustration of parts used for installing the belt conveyor device 10 is omitted.

The tail pulley 11 is disposed on one end side in a longitudinal direction of the conveyor frame 13, so that an axial direction of the tail pulley 11 is orthogonal to the conveyance direction, and the axial direction of the tail pulley 11 is included on a plane parallel to an upper surface of the conveyor frame 13. The tail pulley 11 is provided to the conveyor frame 13 via bearing portions 15, 16. Further, the head pulley 12 is disposed on the other end side in the longitudinal direction of the conveyor frame 13, so that an axial direction of the head pulley 12 becomes parallel to the axial direction of the tail pulley 11. The head pulley 12 is provided to the conveyor frame 13 via bearing portions 17, 18.

In this belt conveyor device 10, the endless belt 14 is laid over the tail pulley 11 and the head pulley 12, and an upper surface of the belt portion positioned on an approach route side of the endless belt 14 laid over the tail pulley 11 and the head pulley 12 corresponds to a conveyance surface of the conveyance object. Meanwhile, the belt portion positioned on the return route side of the endless belt 14 laid over the tail pulley 11 and the head pulley 12 is wound around a snub pulley 31, a take-up pulley 32, and a drive pulley 33 provided to the drive device 30, in an order of the snub pulley 31, the drive pulley 33, and the take-up pulley 32. Each of axial lengths of the tail pulley 11 and the head pulley 12 is smaller than the width of the endless belt 14 by a predetermined amount, and edges of the endless belt 14 are designed to wind around both edges of the tail pulley 11 and the head pulley 12. Consequently, in a state where the meandering starts in a manner that one of both edges in the width direction of the endless belt 14 largely protrudes and the other slightly protrudes, there is generated a difference in forces toward an inner side in the width direction of the endless belt 14 acted on the edges of the tail pulley 11 and the head pulley 12 by the edges of the endless belt 14, and the force from the largely-protruded one belt edge becomes large, resulting in that the force is applied to the inner side on one side of the endless belt 14, and the endless belt 14 can return to the state where the meandering is stopped. For this reason, a straight pulley whose outer shape is fixed in an axial direction can be used for each of the tail pulley 11 and the head pulley 12, which can reduce labor and cost of processing.

Figure 4:
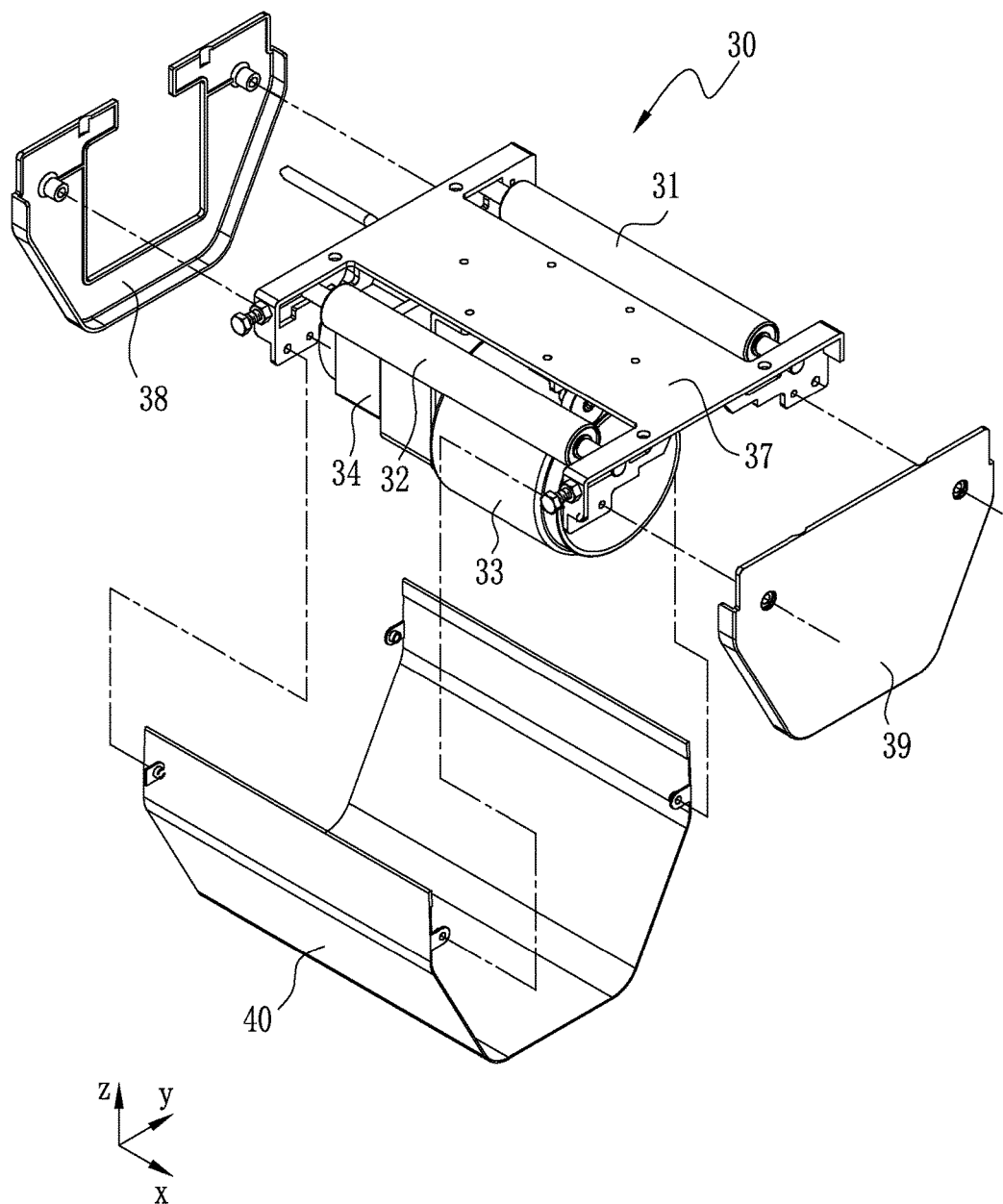
FIG. 4 shows an exploded perspective view illustrating a configuration of the drive device.
Figure 5:
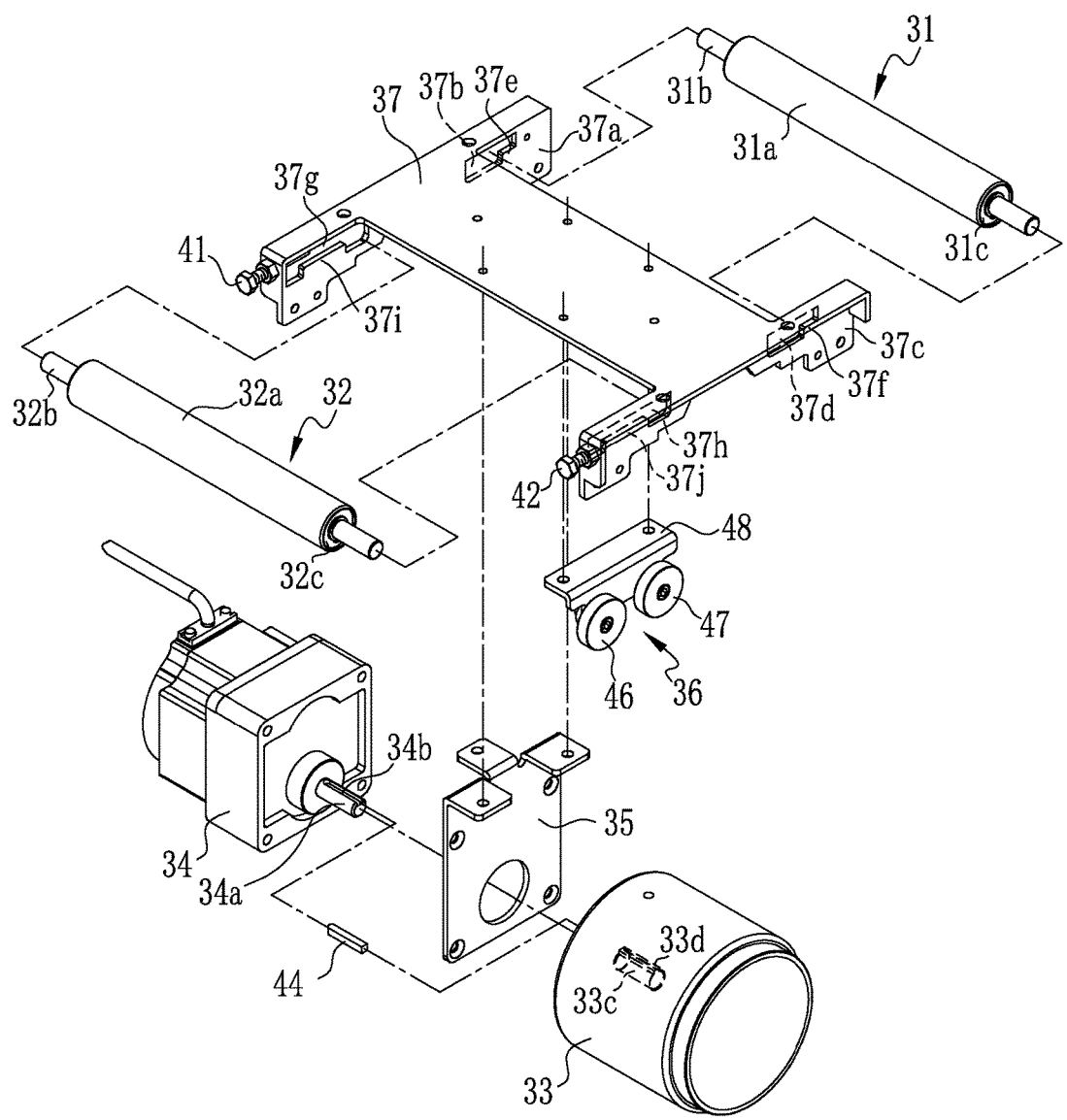
FIG. 5 shows an exploded perspective view illustrating a configuration of the drive device.
Figure 6:
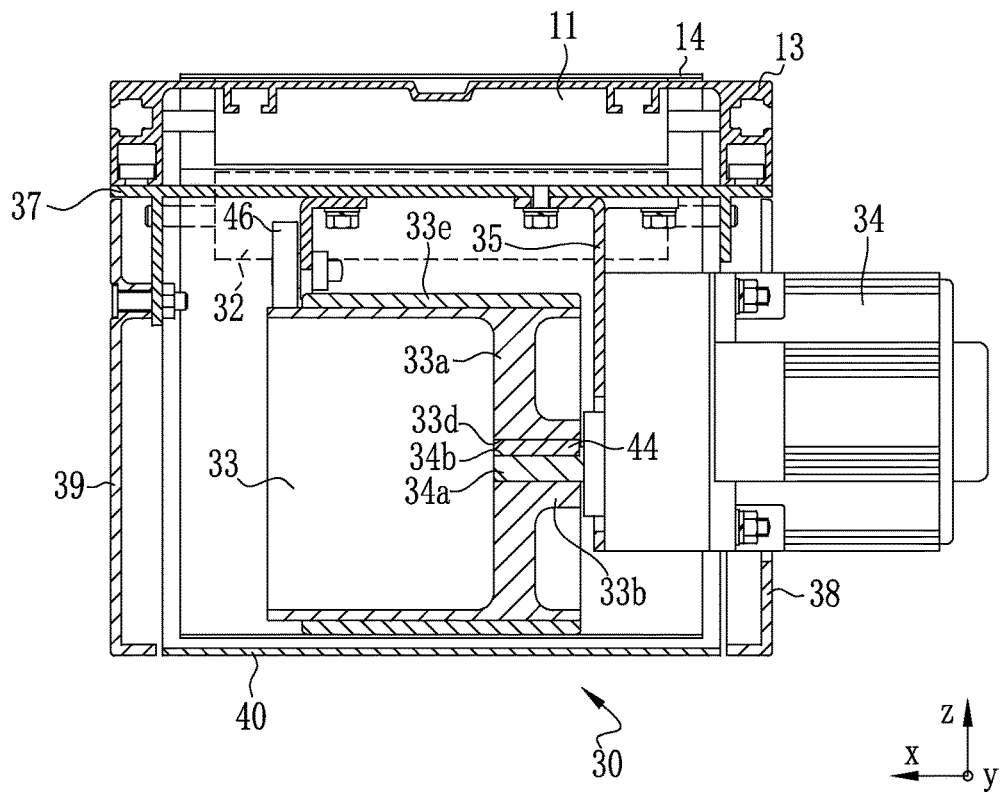
FIG. 6 shows a B-B cross sectional view in FIG. 2.
Figure 7:
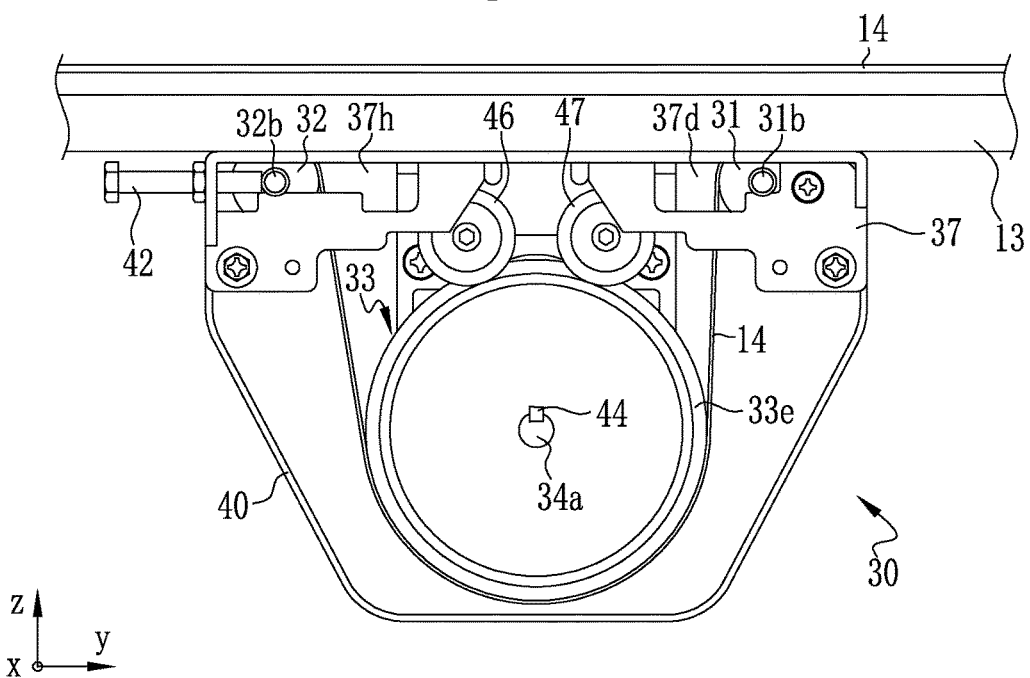
FIG. 7 shows a plan view illustrating a state where a cover of the drive device is removed.

The drive device 30 is provided for making the endless belt 14 of the belt conveyor device 10 described above travel. Note that as illustrated in FIG. 2, the drive device 30 is provided further on a downstream side by a predetermined amount with respect to an approximately center portion in a longitudinal direction of the conveyor frame 13. As illustrated in FIG. 4 to FIG. 6, the drive device 30 includes the snub pulley 31, the take-up pulley 32, the drive pulley 33, a drive motor 34, a motor bracket 35, an auxiliary roller pair 36, a support frame 37, side covers 38, 39, an undercover 40, and the like. Here, the snub pulley 31, the take-up pulley 32, the drive pulley 33, the motor bracket 35, and the support frame 37 are formed of a metal material such as aluminum, for example.

When the drive device 30 is attached to the conveyor frame 13, the snub pulley 31 is pivotally attached to the support frame 37 so as to be positioned at a downstream end portion of the support frame 37. The front side of the belt positioned on the return route side of the endless belt 14 turned back toward the tail pulley 11 side by the head pulley 12, is wound around the snub pulley 31, and the snub pulley 31 turns back the belt toward the drive pulley 33. The snub pulley 31 includes a cylindrical pulley part 31a around which the endless belt 14 is wound, a support shaft 31b to be a rotation center of the snub pulley 31, and bearings 31c provided at both end portions of the pulley part 31a, and into which the support shaft 31b is inserted. Namely, when the endless belt 14 travels, only the pulley part 31a of the snub pulley 31 is designed to rotate.

Regarding the snub pulley 31, one end side in a longitudinal direction of the support shaft 31b is inserted into an opening 37b formed on a sidewall 37a of the support frame 37, and then the other end side of the support shaft 31b is inserted into an opening 37d formed on a sidewall 37c of the support frame 37. On the both end portions and lower portions of outer peripheral surfaces of the support shaft 31b, grooves (whose illustration is omitted) with widths in accordance with thicknesses of the sidewall 37a and the sidewall 37c of the support frame 37, are respectively provided. When the snub pulley 31 is attached to the support frame 37, a support part 37e provided to the opening 37b is inserted into the groove provided on the one end side in the longitudinal direction of the support shaft 31b, and a support part 37f provided to the opening 37d is inserted into the groove provided on the other end side in the longitudinal direction of the support shaft 31b. Depths of the grooves provided to the both end portions in the longitudinal direction of the support shaft 31b are the same. Further, an upper surface of the support part 37e provided to the opening 37b and an upper surface of the support part 37f provided to the opening 37d are positioned at the same height in a z direction in FIG. 5. Therefore, when the snub pulley 31 is attached to the support frame 37, an axial direction of the support shaft 31b of the snub pulley 31 is the same direction as the axial direction of the tail pulley 11 and the head pulley 12 (x direction). Note that when the snub pulley 31 is attached to the support frame 37, a vertex portion of the snub pulley 31 is held to a position at which the portion projects upward from the support frame 37.

The take-up pulley 32 is pivotally attached to the support frame 37 so as to be positioned at an upstream end portion of the support frame 37. The belt portion positioned on the return route side of the endless belt 14 turned back toward the head pulley 12 side by the tail pulley 11, is wound around the take-up pulley 32, and the take-up pulley 32 turns back the belt toward the drive pulley 33. The take-up pulley 32 includes a cylindrical pulley part 32a around which the endless belt 14 is wound, a support shaft 32b to be a rotation center of the take-up pulley 32, and bearings 32c provided at both end portions of the pulley part 32a, and into which the support shaft 32b is inserted. Namely, when the endless belt 14 travels, only the pulley part 32a of the take-up pulley 32 is designed to rotate.

Regarding the take-up pulley 32, one end side in a longitudinal direction of the support shaft 32b is inserted into an opening 37g formed on the sidewall 37a of the support frame 37, and then the other end side of the support shaft 32b is inserted into an opening 37h formed on the sidewall 37c of the support frame 37. On the both end portions and lower portions of outer peripheral surfaces of the support shaft 32b, grooves (whose illustration is omitted) with widths in accordance with thicknesses of the sidewall 37a and the sidewall 37c of the support frame 37, are respectively provided. When the take-up pulley 32 is attached to the support frame 37, a support part 37i provided to the opening 37g is inserted into the groove provided on the one end side in the longitudinal direction of the support shaft 32b, and a support part 37j provided to the opening 37h is inserted into the groove provided on the other end side in the longitudinal direction of the support shaft 32b. Depths of the grooves provided to the both end portions in the longitudinal direction of the support shaft 32b are the same. Further, an upper surface of the support part 37i provided to the opening 37g and an upper surface of the support part 37j provided to the opening 37h are positioned at the same height in the z direction in FIG. 5. Therefore, when the take-up pulley 32 is attached to the support frame 37, an axial direction of the support shaft 32b of the take-up pulley 32 is a direction same as the axial direction of the tail pulley 11 and the head pulley 12 (x direction). Note that when the take-up pulley 32 is attached to the support frame 37, a vertex portion of the take-up pulley 32 is held to a position at which the portion projects upward from the support frame 37.

A bolt (referred to as take-up bolt, hereinafter) 41 is screwed into the sidewall 37a of the support frame 37, and a take-up bolt 42 is screwed into the sidewall 37c of the support frame 37. These take-up bolts 41, 42 press, when they are tightened, the support shaft 32b of the take-up pulley 32 toward the downstream side in the conveyance direction, to thereby move the take-up pulley 32 toward the snub pulley 31. By moving the take-up pulley 32 toward the snub pulley 31, it is possible to apply tension to the endless belt 14. Note that the pressing mechanism for the support shaft of the pulley realized by the take-up bolts, in other words, the take-up mechanism 5 may also be provided at the position of the snub pulley 31, instead of the position of the take-up pulley 32, and in such a case, the positional relationship between the head part and the tail part of the belt conveyor device is reversed.

The drive pulley 33 is disposed to be positioned between the snub pulley 31 and the take-up pulley 32 in the conveyance direction of the conveyance object, so that a surface on the opposite side (backside) of the conveyance surface of the endless belt 14 can be wound around the drive pulley 33 so as to face an outer peripheral surface of the drive pulley 33. Further, when the drive device 30 is attached to the belt conveyor device 10, the drive pulley 33 of the drive device 30 is disposed at an approximately center portion in an axial direction of the endless belt 14.

In an inner space of the drive pulley 33, a disk part 33a is formed at a position displaced from a center portion in the drive shaft direction to the drive motor 34 side. Namely, the disk part 33a being a part of the drive pulley 33 and to which the drive shaft is fitted, is positioned by being offset from the center in the width direction of the endless belt 14 to the drive motor 34 side. When the disk part 33a is provided at this position, the length of the drive shaft 34a being the output shaft of the drive motor 34 can be shortened, and it is possible to reduce a bending moment related to the drive shaft 34a having a thin cylindrical cross section. Note that regarding the drive pulley 33, although the bending moment is generated by the offset disk part 33a, the influence on the drive pulley 33 with high rigidity is small. A center portion of the disk part 33a projects in a cylindrical shape toward the end portion on the right side in FIG. 6. Hereinafter, the portion projected in the cylindrical shape from the disk part 33a, is referred to as a projecting portion 33b. On the projecting portion 33b, there is provided an insertion hole 33c coaxial with the center axis of the drive pulley 33. On the insertion hole 33c, there is provided a key groove 33d into which a parallel key 44 to be described later is inserted.

The outer peripheral surface of the drive pulley 33 is subjected to lining processing using a synthetic resin material such as urethane. In FIG. 6, a portion on which the lining processing is performed is denoted by a reference numeral 33e. By performing the lining processing, it becomes possible to prevent the rotary-driven drive pulley 33 from slipping with respect to the endless belt 14. Here, a range of the outer peripheral surface of the drive pulley 33 on which the lining processing is performed, may be set to the entire outer peripheral surface, or a range except for a predetermined range from the other end on the opposite side of one end to which the drive motor 34 is attached in the axial direction of the drive pulley 33. Outer peripheral surfaces of the auxiliary rollers 46, 47 of the auxiliary roller pair 36 are abutted against the outer peripheral surface of the drive pulley 33, so that as the predetermined range, it is desirable to set at least a range equal to or greater than the thickness of each of the auxiliary rollers 46, 47 of the auxiliary roller pair 36. FIG. 5 illustrates the drive pulley 33 in which the lining processing is performed on a range except for a predetermined range from the other end on the opposite side of one end to which the drive motor 34 is attached in the axial direction of the drive pulley 33.

For the drive motor 34, a general-purpose drive motor whose output is 25 W, for example, is used. Here, the drive motor 34 employs a drive motor whose output is the same even when the belt width of the used endless belt 14 is changed. The drive motor 34 is fixed to a lower surface of the support fame 37 via the motor bracket 35. The motor bracket 35 has a plate shape, and is attached to a casing surface of the drive motor 34, which faces the drive pulley 33 and from which a drive shaft 34a being an output shaft projects, at a position in the immediate vicinity of the drive pulley 33. Namely, the plate-shaped motor bracket 35 is attached to the casing surface which faces the drive pulley 33 fitted to the output shaft in a cantilever manner and from which the output shaft projects, and the drive motor 34 is held in a state of being hung from the lower surface of the support frame 37 by using the motor bracket 35. Consequently, a rigid fulcrum is formed in the middle of the length of the drive shaft 34a, resulting in that a bending moment related to the drive shaft 34a can be minimized. Further, since the heavy drive motor 34 is positioned on the opposite side of the drive pulley 33 by sandwiching the motor bracket 35 to be the fulcrum, a moment related to the drive pulley 33 due to separation from the motor bracket 35 acts to be balanced by a moment caused when the drive motor 34 separates from the motor bracket 35 due to its gravitation. Further, although the motor bracket 35 has a thin thickness, it has a width dimension parallel to the conveyance direction, so that because of the member in the width direction, the motor bracket 35 becomes a fulcrum resistant to a twist, accordingly, resistant to the moment applied to the drive shaft 34a.

The drive motor 34 holds the drive pulley 33 after the drive shaft 34a of the drive motor 34 is inserted into the insertion hole 33c of the drive pulley 33. A key groove 34b is provided to the drive shaft 34a of the drive motor 34, and when the drive shaft 34a is inserted into the insertion hole 33c of the drive pulley 33, the key groove 34b provided to the drive shaft 34a of the drive motor 34 and the key groove 33d provided to the insertion hole 33c of the drive pulley 33 are faced. Subsequently, the parallel key 44 is inserted into a space generated when the key groove 34b and the key groove 33d are faced. By the insertion of the parallel key 44, a relative position in a rotational direction of the drive pulley 33 with respect to the drive shaft 34a of the drive motor 34 is fixed. Although the illustration is omitted, a screw hole is provided to the outer peripheral surface of the drive pulley 33. After the parallel key 44 is inserted into the space generated when the key groove 34b and the key groove 33d are faced, an inside screw is screwed into the screw hole provided to the outer peripheral surface of the drive pulley 33, and the inside screw is tightened, resulting in that a relative position in the axial direction of the drive pulley 33 with respect to the drive shaft 34a of the drive motor 34 is fixed.

The auxiliary roller pair 36 includes the two auxiliary rollers 46, 47 on which lining processing using a synthetic resin material such as urethane is performed, and a bracket 48. When the drive device 30 is assembled, the bracket 48 of the auxiliary roller pair 36 is fixed to the lower surface of the support frame 37. Therefore, the auxiliary roller pair 36 is held in a state of being hung from the support frame 37. Further, when the drive device 30 is assembled, the outer peripheral surfaces of the auxiliary rollers 46, 47 of the auxiliary roller pair 36 are respectively abutted against the portion, of the drive pulley 33, on which no lining processing is performed, at a position in the vicinity of a vertex of the outer peripheral surface of the drive pulley 33.

When the drive pulley 33 is rotary-driven, frictional force is generated between the drive pulley 33, and the auxiliary rollers 46, 47 of the auxiliary roller pair 36 abutted against the drive pulley 33. Due to the frictional force generated between the drive pulley 33, and the auxiliary rollers 46, 47 of the auxiliary roller pair 36 abutted against the drive pulley 33, the auxiliary rollers 46, 47 of the auxiliary roller pair 36 are respectively rotated. Here, if the lining processing is not performed on the outer peripheral surfaces of the auxiliary rollers, when the drive pulley 33 is rotary-driven, the outer peripheral surface of the rotary-driven drive pulley 33 rotates by being rubbed against each of the auxiliary rollers of the auxiliary roller pair 36, and at the time of this rotation, abnormal noise is generated. Therefore, by performing the lining processing on the outer peripheral surfaces of the respective auxiliary rollers of the auxiliary roller pair 36, when the drive pulley 33 is rotary-driven, the drive pulley 33 and the auxiliary rollers 46, 47 of the auxiliary roller pair 36 are prevented from rotating while being rubbed against each other, thereby suppressing the generation of abnormal noise. Further, during the rotation of the auxiliary rollers 46, 47 of the auxiliary roller pair 36, even if the auxiliary rollers 46, 47 tentatively vibrate, the urethane provided to the outer peripheral surfaces of the auxiliary rollers 46, 47 of the auxiliary roller pair 36 absorbs the vibration. Therefore, the vibration of the auxiliary rollers 46, 47 of the auxiliary roller pair 36 is prevented from transmitting to the drive pulley 33. As a result of this, the vibration of the drive shaft 34a of the drive motor 34 due to the vibration of the auxiliary rollers 46, 47 of the auxiliary roller pair 36 is prevented.

Further, by employing the configuration in which the auxiliary rollers 46, 47 of the auxiliary roller pair 36 are abutted against the outer peripheral surface of the drive pulley 33 on the other end side being the opposite side of the one end to which the drive motor 34 is attached, the following operations are realized. As described above, after the drive device 30 is attached to the belt conveyor device 10, work of tightening each of the take-up bolts 41, 42 to apply tension to the endless belt 14 is conducted. During this work, there is a case where the take-up bolts 41, 42 are tightened too much to apply excessive tension to the endless belt 14.

As described above, the drive pulley 33 is attached to the drive shaft 34a of the drive motor 34. When the general-purpose drive motor whose output is 25 W is used as the drive motor 34, a diameter of the drive shaft 34a is small. Further, the projecting portion 33b provided to the disk part 33a of the drive pulley 33 is formed at the end portion on the drive motor 34 side in the axial direction of the drive pulley 33. Therefore, if the tension is excessively applied to the endless belt 14, excessive stress is applied to the end portion on the opposite side of the end portion on the drive motor 34 side in the axial direction of the drive pulley 33. As a result of this, the drive shaft 34a of the drive motor 34 bends or the drive shaft 34a of the drive motor 34 breaks. For example, if the drive shaft 34a of the drive motor 34 bends, the drive pulley 33 is eccentrically rotary-driven, resulting in that the endless belt 14 travels in a meandering manner.

Therefore, by making the auxiliary rollers 46, 47 of the auxiliary roller pair 36 described above abut against the outer peripheral surface of the drive pulley 33 on the end portion side being the opposite side of the end portion on the drive motor 34 side in the axial direction of the drive pulley 33, when the excessive tension is applied to the endless belt 14, it becomes possible to prevent the bending of the drive shaft 34a of the drive motor 34, or the breaking of the drive shaft 34a. Further, by preventing the bending of the drive shaft 34a of the drive motor 34, the meandering of the traveling endless belt 14 is also prevented.

Here, if the drive motor 34 employs, not the general-purpose drive motor, but a drive motor dedicated to the belt conveyor device 10, it is also possible to increase the diameter of the drive shaft of the drive motor 34. Therefore, when the dedicated drive motor is used, there is no need to provide the above-described auxiliary roller pair 36.

Further, although the lining processing using the synthetic resin material such as urethane is performed on the outer peripheral surfaces of the auxiliary rollers 46, 47 of the auxiliary roller pair 36, if the lining processing is performed on the entire outer peripheral surface of the drive pulley 33, there is no need to perform the lining processing on the outer peripheral surfaces of the auxiliary rollers 46, 47 of the auxiliary roller pair 36.

The side cover 38 is provided to cover the end portion on the right side in FIG. 6 in the width direction of the endless belt 14, and the side cover 39 is provided to cover the end portion on the left side in FIG. 6 in the width direction of the endless belt 14. The undercover 40 is attached to the support frame 37 of the drive device 30 to cover a lower part of the drive device 30 from the side surface on the upstream side to the side surface on the downstream side of the drive device 30.

The endless belt 14 and the respective pulleys used for the above-described belt conveyor device 10 are set as follows. When a belt width of an endless belt used for the belt conveyor device 10 is set to W1, for example, the belt width W1 of the endless belt 14 is set in a manner that a change in size can be made in a unit of 50 mm, in a range of 100 to 300 mm. Each of a width W2 of the tail pulley 11 and a width W3 of the head pulley 12 is also similarly set in a manner that a change in size can be made in a unit of 50 mm. Here, with respect to the belt width W1 of the endless belt 14, the width W2 of the tail pulley 11 and the width W3 of the head pulley 12 satisfy relations of W1>W2, W1>W3, and W2=W3, and a dimensional difference of W2-W1 is a predetermined amount.

Concretely, when an amount of linear dimension of the head pulley 12 and the tail pulley 11 which is reduced by a predetermined amount with respect to the width W1 of the endless belt 14, is set to 20 mm, for example, if the belt width W1 of the endless belt 14 is 100 mm, each of the width W2 of the tail pulley 11 and the width W3 of the head pulley 12 is set to 80 mm. Further, if the belt width W1 of the endless belt 14 is 150 mm, each of the width W2 of the tail pulley 11 and the width W3 of the head pulley 12 is set to 130 mm. If the belt width W1 of the endless belt 14 is 200 mm, each of the width W2 of the tail pulley 11 and the width W3 of the head pulley 12 is set to 180 mm. If the belt width W1 of the endless belt 14 is 250 mm, each of the width W2 of the tail pulley 11 and the width W3 of the head pulley 12 is set to 230 mm. If the belt width W1 of the endless belt 14 is 300 mm, each of the width W2 of the tail pulley 11 and the width W3 of the head pulley 12 is set to 280 mm. Note that FIG. 1 to FIG. 6 illustrate the belt conveyor device 10 when the belt width W1 of the endless belt 14 is set to 150 mm.

With respect to the width W1 of the endless belt 14, the width W2 of the tail pulley 11, and the width W3 of the head pulley 12 which are set as described above, widths of the snub pulley 31, the take-up pulley 32, and the drive pulley 33 are set as follows. Hereinafter, the width of the snub pulley 31 is set to W4, the width of the take-up pulley 32 is set to W5, and the width of the drive pulley 33 is set to W6. For example, each of the width W4 of the snub pulley 31 and the width W5 of the take-up pulley 32 is set to the same width as the width W2 of the tail pulley 11 and the width W3 of the head pulley 12. Each of the width W4 of the snub pulley 31 and the width W5 of the take-up pulley 32 is set in a manner that a change in size can be made in a unit of 50 mm, in a range of 80 to 280 mm. Note that the width W6 of the drive pulley 33 is set to the same width even when the width of the endless belt 14 is changed in a range of 100 to 300 mm. Concretely, the width W6 of the drive pulley is 80 mm.

The above-described endless belt 14 is wound around the respective pulleys so that a center in the width direction of the endless belt 14 coincides with a center in the width direction of each of the tail pulley 11, the head pulley 12, the snub pulley 31, and the take-up pulley 32. Further, the drive pulley 33 is disposed so that a center in the axial direction of the portion, on which the lining processing is performed, of the outer peripheral surface of the drive pulley 33 coincides with the center in the width direction of the endless belt 14.

Here, the belt width W1 of the endless belt 14 is set to satisfy the relation of W1>W3, with respect to the width W3 of the head pulley 12. When manufacturing the belt conveyor device 10, amounts of lengths (widths) by which the endless belt 14 protrudes from the head pulley 12 are the same on one end side and the other end side of the endless belt 14. For example, tensions which act from respective both end portions of the endless belt 14 wound around the head pulley 12 toward a center of both end surfaces of the snub pulley 31 are the same. Specifically, stresses in the width direction of the endless belt 14 which act on the respective both end portions of the endless belt 14 become the same.

A case where external force is applied to the endless belt 14, and the endless belt 14 sways in the width direction is considered. For example, if the endless belt sways in the width direction, stresses in the width direction of the endless belt 14 which act on the respective both end portions of the endless belt 14 change, which brings about a difference between the stress in the width direction at the one end portion of the endless belt 14 and the stress in the width direction at the other end portion of the endless belt 14. Therefore, the endless belt 14 slides in a direction opposite to the direction in which the belt is swayed, so that the difference between the stress in the width direction at the one end portion of the endless belt 14 and the stress in the width direction at the other end portion of the endless belt 14 is eliminated. Specifically, when the endless belt 14 sways in the −x direction in FIG. 3 in the width direction, the endless belt 14 slides in the x direction to return to its original state. Further, when the endless belt 14 sways in the x direction in FIG. 3 in the width direction, the endless belt 14 slides in the −x direction to return to its original state.

The operation with respect to the endless belt 14 is the same among the other pulleys. Therefore, by setting the width of each of the pulleys provided to the belt conveyor device 10 to be narrower than the width of the endless belt 14, even when the endless belt 14 travels in a meandering manner, the endless belt 14 can be returned to its original state, and thus it is possible to make the endless belt 14 stably travel.

Figure 8:
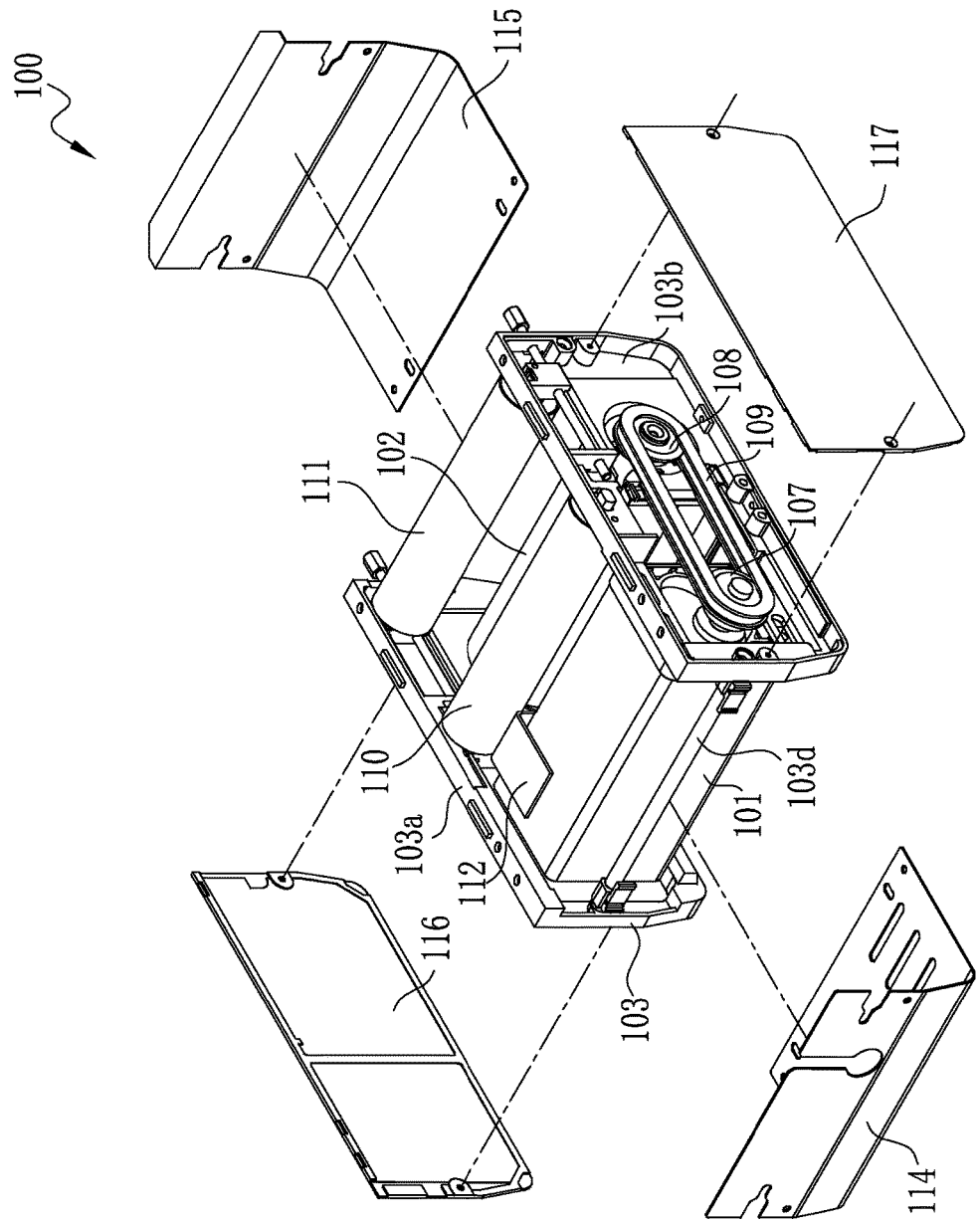
FIG. 8 shows an exploded perspective view illustrating a conventional drive device provided to a belt conveyor device.
Figure 9:
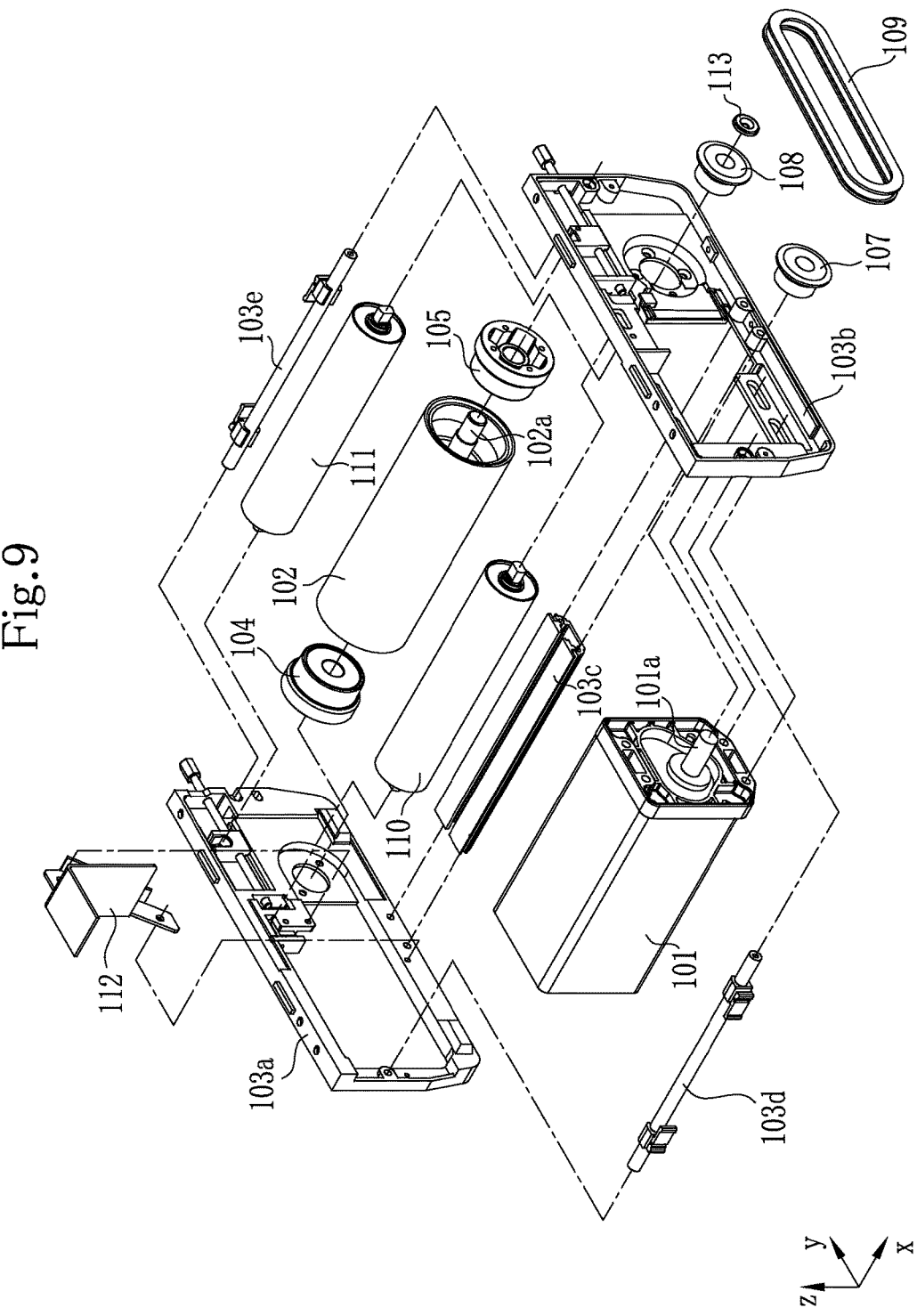
FIG. 9 shows an exploded perspective view illustrating the conventional drive device provided to the belt conveyor device.

As stated above, the drive device 30 provided to the belt conveyor device 10 described above has the following advantageous points. As illustrated in FIG. 8 and FIG. 9, when the drive motor 101 and the drive pulley 102 are provided side by side in the conventional drive device 100, in order to transmit the driving force obtained when the drive motor 101 is driven to the drive pulley 102, it is required that the sprockets 107, 108 are fixed to the drive shaft 101a of the drive motor 101 and the rotary shaft 102a of the drive pulley 102, respectively, and then the chain 109 is wound around the sprockets 107, 108. Further, when the drive motor 101 and the drive pulley 102 are disposed side by side, the rotary shaft 102a of the drive pulley 102 has one end side thereof pivotally supported or pivotally fitted to the side frame 103a via the bearing member 104, and the other end side thereof pivotally supported or pivotally fitted to the side frame 103b via the bearing member 105. Therefore, the number of parts which includes the drive transmitting mechanism by which the drive pulley 102 is rotary-driven becomes very large. Further, when the drive motor 101 and the drive pulley 102 are provided side by side, the structure of the support frame 103 to which the drive motor 101 and the drive pulley 102 are attached becomes complicated, and because of the structure, the support frame 103 has to be formed of plural parts. Further, the number of fastening members such as bolts used when assembling these parts also becomes large.

However, in the drive device 10 of the present embodiment, the drive pulley 33 is directly attached to the drive shaft 34a of the drive motor 34. Therefore, it is possible to omit the configuration of the drive transmitting mechanism which is required when the drive motor 101 and the drive pulley 102 are provided side by side. Further, by directly attaching the drive pulley 33 to the drive shaft 34a of the drive motor 34, the shape of the support frame 37 can also be simplified, and thus it is possible to manufacture the support frame 37 formed of one part, without employing the configuration of the support frame 103 formed by assembling the plural parts and used in the conventional drive device 100. Further, by employing the configuration as above, it also becomes possible to reduce the number of fastening members such as bolts used when assembling the parts. Therefore, because of the reduction in the number of parts which form the drive device, it is possible to realize not only the suppression of product costs of the parts but also the suppression of manufacturing costs when manufacturing the drive device.

Further, regarding the drive device 30 of the present embodiment, some parts such as the drive pulley 33, the drive motor 34, and the auxiliary roller pair 36 are used in common in the belt conveyor device in which there are plural specifications regarding the endless belt. Therefore, even if there are plural specifications regarding the endless belt 14, it is possible to reduce the number of parts which are set in accordance with the specifications of the endless belt. Therefore, it is possible to suppress the product costs of the parts and the manufacturing costs of the drive device.

Although details are not described regarding the material of the side covers 38, 39 in the drive device 30 of the present embodiment, the side covers 38, 39 may be provided by using a metal material, or they may also be provided by using a synthetic resin material or a material with transparency such as a glass material.

For example, depending on a conveyance object conveyed by the belt conveyor device 10, there is a case where the conveyance object gets caught in the endless belt 14 turned back at the downstream end portion, to be conveyed on the return route side of the endless belt 14, and then enters the drive device 30. Further, other than the above, depending on the environment under which the belt conveyor device 10 is installed, there is a case where foreign substances such as dust or coarse particulate enter the inside the drive device 30. These foreign substances enter between the endless belt 14 and the drive pulley 33, and damage the portion, of the outer peripheral surface of the drive pulley 33, on which the lining processing is performed, or change the shape of the lining processing. This consequently becomes a reason of causing the meandering of the endless belt 14 which is traveled when the drive pulley 33 is rotary-driven.

Figure 10:
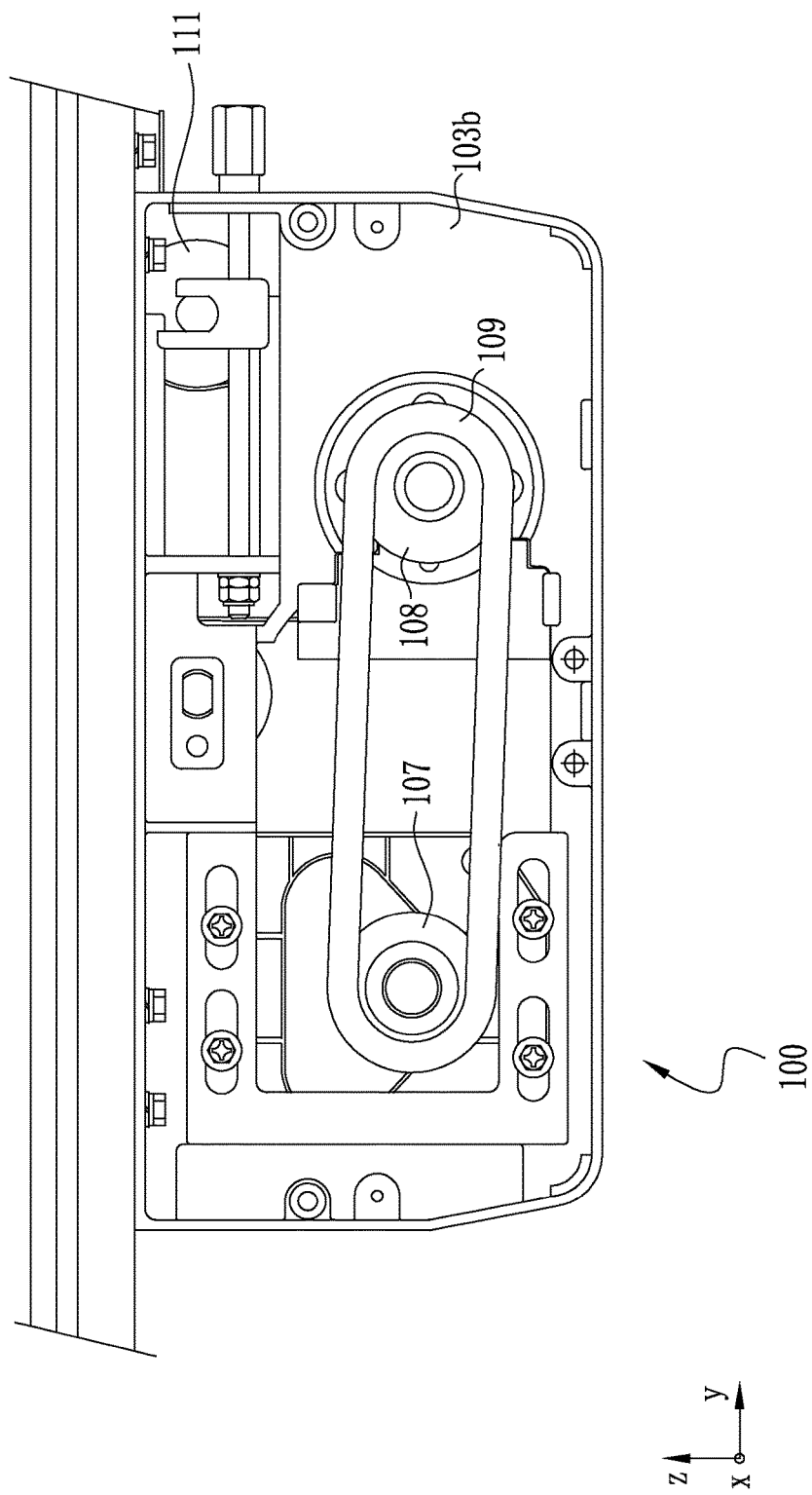
FIG. 10 shows a plan view illustrating a state where a side cover of the conventional drive device is removed.

In the conventional drive device 100 illustrated in FIG. 8 to FIG. 10, the both end portions of the rotary shaft 102a of the drive pulley 102 are attached to the side frames 103a, 103b via the bearing members 104, 105. Therefore, even if the side covers 116, 117 are removed, the vicinity of the drive pulley 102 cannot be visually recognized, so that it is not possible to check the presence/absence of mixing of the foreign substances. Therefore, in the conventional drive device 100, there is a need to perform maintenance work by disassembling the device on regular basis.

On the other hand, in the drive device 30 of the present embodiment, the drive pulley 33 is directly attached to the drive motor 34 to simplify the structure of the drive device 10, and further, by forming the side cover 39 using the material with transparency, the presence/absence of a conveyance object or the foreign substances entered inside the drive device 30 can be checked through the side cover, which eliminates the necessity of performing the maintenance work on regular basis. Further, since the presence/absence of the conveyance object or the foreign substances entered inside the drive device 30 can be checked through the side cover, when there is the conveyance object or the foreign substances inside the drive device 30, it can be immediately removed, and as a result of this, the portion, of the outer peripheral surface of the drive pulley 33, on which the lining processing is performed, and the portions, of the outer peripheral surfaces of the auxiliary rollers 46, 47 of the auxiliary roller pair 36, on which the lining processing is performed, can be prevented from being damaged, and the change in the shape of the portions subjected to the lining processing can be prevented.

The many features and advantages of the embodiment are apparent from the detailed specification and, thus, it is intended by the appended claims to cover all such features and advantages of the embodiment that fall within the true spirit and scope thereof. Further, since numerous modifications and changes will readily occur to those skilled in the art, it is not desired to limit the inventive embodiment to exact construction and operation illustrated and described, and accordingly all suitable modifications and equivalents may be resorted to, falling within the scope thereof.

The invention claimed is:

1. A drive device for a belt conveyor device which conveys a conveyance object by making travel an endless belt being laid over a head pulley disposed on one end side of a conveyor frame and a tail pulley disposed on the other end side of the conveyor frame, the head pulley has an axial length smaller than an endless belt width by a predetermined amount and the tail pulley has an axial length smaller than the endless belt width by a predetermined amount, the drive device for the belt conveyor device comprising:
   a drive pulley making the endless belt travel during a rotary-drive by being wound a rear surface of the belt on a return route side of the endless belt, the drive pulley has a drive shaft direction length less than a plurality of previously set belt widths of the endless belt with respect to a plurality of types of the belt conveyor device being set a plurality of machine widths and has the driving shaft direction length being set to a same length regardless of the plurality of previously set belt widths of the endless belt;
   a first pulley turning back a front surface of the belt on the return route side of the endless belt turned back by the tail pulley toward the drive pulley, the first pulley has an axial length being set in accordance with the plurality of previously set belt widths of the endless belt and has the axial length being set to a same length as the axial lengths of the head pulley and the tail pulley;
   a second pulley turning back the front surface of the belt on the return route side of the endless belt turned back by the head pulley toward the drive pulley, the second pulley has an axial length being set to a same length as the axial length of the first pulley;
   a support frame being provided to a lower portion of the conveyor frame and being rotatably attached the first pulley and the second pulley at both ends in a pivotally supported manner;
   a drive motor having the drive shaft of the drive pulley as an output shaft and being hung from a lower surface of the support frame in order for the drive pulley to be positioned at an approximately center portion in a width direction of the endless belt laid on the belt conveyor device; and
   a take-up mechanism being capable of applying tension to the endless belt by being adjusted a position of either one of the first pulley and the second pulley toward one of the second pulley and the first pulley.

2. A drive device for a belt conveyor device, comprising the drive device for the belt conveyor device according to claim 1 being used for a drive unit of a belt conveyor device which has an outer shape of each of the head pulley and the tail pulley fixed in the axial direction.

3. The drive device for the belt conveyor device according to claim 1, wherein
   the drive motor attaches a motor bracket in a shape of plate to a casing surface which faces the drive pulley fitted to the output shaft in a cantilever manner and from which the output shaft projects, and is hung from the lower surface of the support frame by the motor bracket.

4. The drive device for the belt conveyor device according to claim 1, wherein
   a disk part being a part of the drive pulley and to which the drive shaft is fitted is offset from a center in the width direction of the endless belt to the drive motor side.

5. The drive device for the belt conveyor device according to claim 1, wherein
   on the other end side being an opposite side of one end on the drive motor side in the drive shaft direction of the drive pulley, a plurality of auxiliary rollers abutted against an outer peripheral surface of the drive pulley is hung from the support frame.

6. The drive device for the belt conveyor device according to claim 5, wherein
   the drive pulley is performed lining processing on a portion of the outer peripheral surface excluding a range in which the plurality of auxiliary rollers are abutted.

7. The drive device for the belt conveyor device according to claim 5, wherein
   the plurality of auxiliary rollers is performed lining processing on each of outer peripheral surfaces of the plurality of auxiliary rollers.

8. The drive device for the belt conveyor device according to claim 1, wherein
   the driving pulley is performed lining processing on the entire outer peripheral surface of the drive pulley.

9. The drive device for the belt conveyor device according to claim 1, further comprising
   a plurality of covers being attached to the support frame covering the drive pulley, the first pulley, and the second pulley, wherein
   among the plurality of covers, at least a cover covering the end side being an opposite side of an end to which the output shaft of the drive motor is attached among both ends in the drive shaft direction of the drive pulley is formed of a material with transparency.

\* \* \* \* \*